Feb. 6, 1962 W. T. HAKE 3,019,672
MACHINE TOOL ADJUSTING MEANS
Filed Nov. 18, 1955 3 Sheets-Sheet 1

INVENTOR
Walter T. Hake
BY Walter L. Schlegel, Jr.
Atty.

Witness:
Ralph M. Faust

Feb. 6, 1962 W. T. HAKE 3,019,672
MACHINE TOOL ADJUSTING MEANS
Filed Nov. 18, 1955 3 Sheets-Sheet 3

INVENTOR.
Walter T. Hake
BY Walter F. Schlegel, Jr.
Atty.

Witness:
Ralph Kofaust

United States Patent Office 3,019,672
Patented Feb. 6, 1962

3,019,672
MACHINE TOOL ADJUSTING MEANS
Walter T. Hake, Cincinnati, Ohio, assignor, by mesne assignments, to Elmes and King Manufacturing Company, Cincinnati, Ohio, a copartnership
Filed Nov. 18, 1955, Ser. No. 547,813
7 Claims. (Cl. 77—4)

This invention relates to boring mills and more particularly to a novel means for manual adjustment of tool settings.

Though metal cutting machines of the type contemplated in this invention include means for automatically moving a tool either horizontally or vertically relative to a work piece which is carried on a rotatable table, it is nevertheless necessary and desirable to include means whereby the tool may be moved manually either horizontally or vertically relative to the work piece. In a facing operation, for example, where a work piece is to be finished to a certain height, it may be necessary to take several cuts across the surface of the work piece in order to obtain the exact desired dimension. In cases such as this, a set-up cut may first be taken to remove the greatest irregularities from the work piece. The piece would then be measured and by taking the difference between the measured dimension of the piece and the desired dimension, the operator would know how much additional metal must be removed. The operator would then advance the tool by manual adjustment means, and take a rough cut, if necessary, followed by a finish cut, depending on circumstances well understood by those skilled in this art.

Existing boring mills have adjusting equipment which is mounted directly on the rail head, generally comprising a shaft, by means of which the feed rod or feed screw may be rotated, the latter motions being transmitted to the tool as horizontal or vertical motion. The handles, or hand wheels, by which the manual adjustment is made are mounted directly on these shafts. Depending on the particular circumstances involved, these hand wheels may be far removed from the work piece, thereby making visual adjustment difficult. Inasmuch as the hand wheel shafts are adjacent the respective feed rod or feed screw, which may be a considerable distance from the floor when the rail is in a raised position, the handles very often are nearly inaccessible.

Another disadvantage inherent in prior art machines is that the dial plates containing the graduations by means of which the operator may read the amount of tool movement are difficult to make and expensive to replace. The reason for this is that the spaced lines comprise individually cut grooves. Alternately, the lines may be formed on the prior art dial plates by means of a rolling die. The numbers generally are stamped on the plate. A dial plate of this type is not only extremely expensive to make and therefore to replace, but it has the added disadvantage of the grooves becoming filled with dirt and grease and therefore hard to read. When dirt and grease is embedded in the grooved depressions in the surface the plates cannot be readily cleaned.

One of the objects of the present invention is to provide manual adjustment means for a tool carrying member in a completely independent unit, which is movable vertically with the rail relative to the work piece, and also movable horizontally relative to the rail on which the unit is mounted.

Another object of the invention is to provide manual adjustment means adaptable for use either on the rail head or on the side head of a vertical boring mill.

Another object of the invention is to provide manual adjustment means in which the hand wheels are completely separated from the dials and at a lower position than the dials, thereby being more readily accessible to the operator.

Another object of this invention is to provide a dial plate which can be produced for a fraction of the cost of those used heretofore.

Still another object is to provide a dial plate which can be easily cleaned and on which the graduations and numbers are easily readable.

Other objects and advantages of the invention will become apparent from the following specification and accompanying drawings, in which:

FIGURE 5 is a plan view of the novel dial plate utilized in the device.

Figure 1:
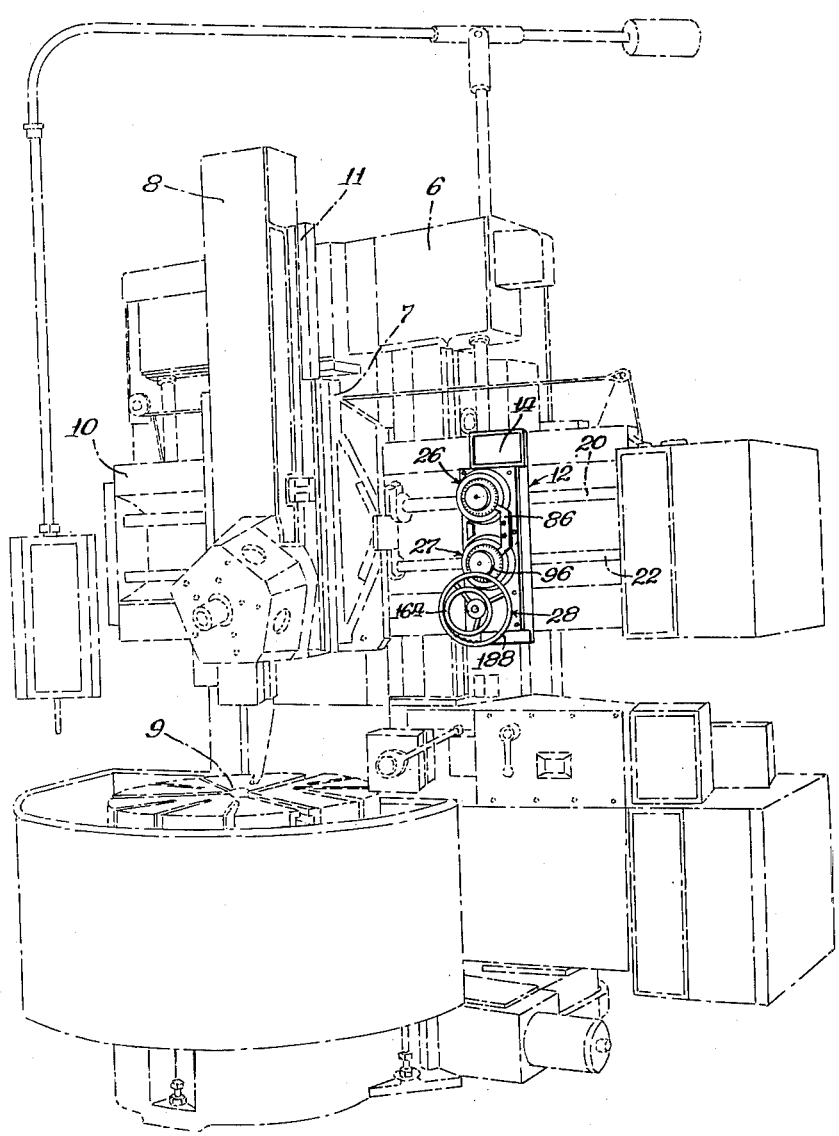
FIGURE 1 is a front elevational view of a vertical boring mill of the type to which the present invention may be adapted.

As will be well understood by those skilled in the art, a vertical boring mill (FIGURE 1) comprises generally a pair of vertically extending columns 6 upon which is mounted a generally horizontal rail 10, the rail being movable up and down on ways 11 provided on the columns. A rail head 7 is movable in a generally horizontal direction across the rail, and the rail is provided with horizontal ways (not shown) to facilitate this movement. A tool carrying ram 8 is mounted for vertical movement in the rail head. In this manner the tool may be brought horizontally or vertically toward or away from a work piece mounted on a table 9. Upward and downward movement is imparted to the ram by means of a feed rod 20 extending substantially the length of the rail, and the motion toward and away from the axis of rotation of the table is imparted to the rail head by means of a cross feed screw 22 extending substantially parallel to the feed rod. The feed rod and the cross feed screw are shown only schematically in the drawings and are not illustrated with respect to the boring mill itself, inasmuch as they are conventional and are well known to those familiar with this art.

Though FIGURE 1 shows a boring mill having both a ram head and a turret head, it will be understood that the invention is not limited solely to this type of mill.

Figure 2:
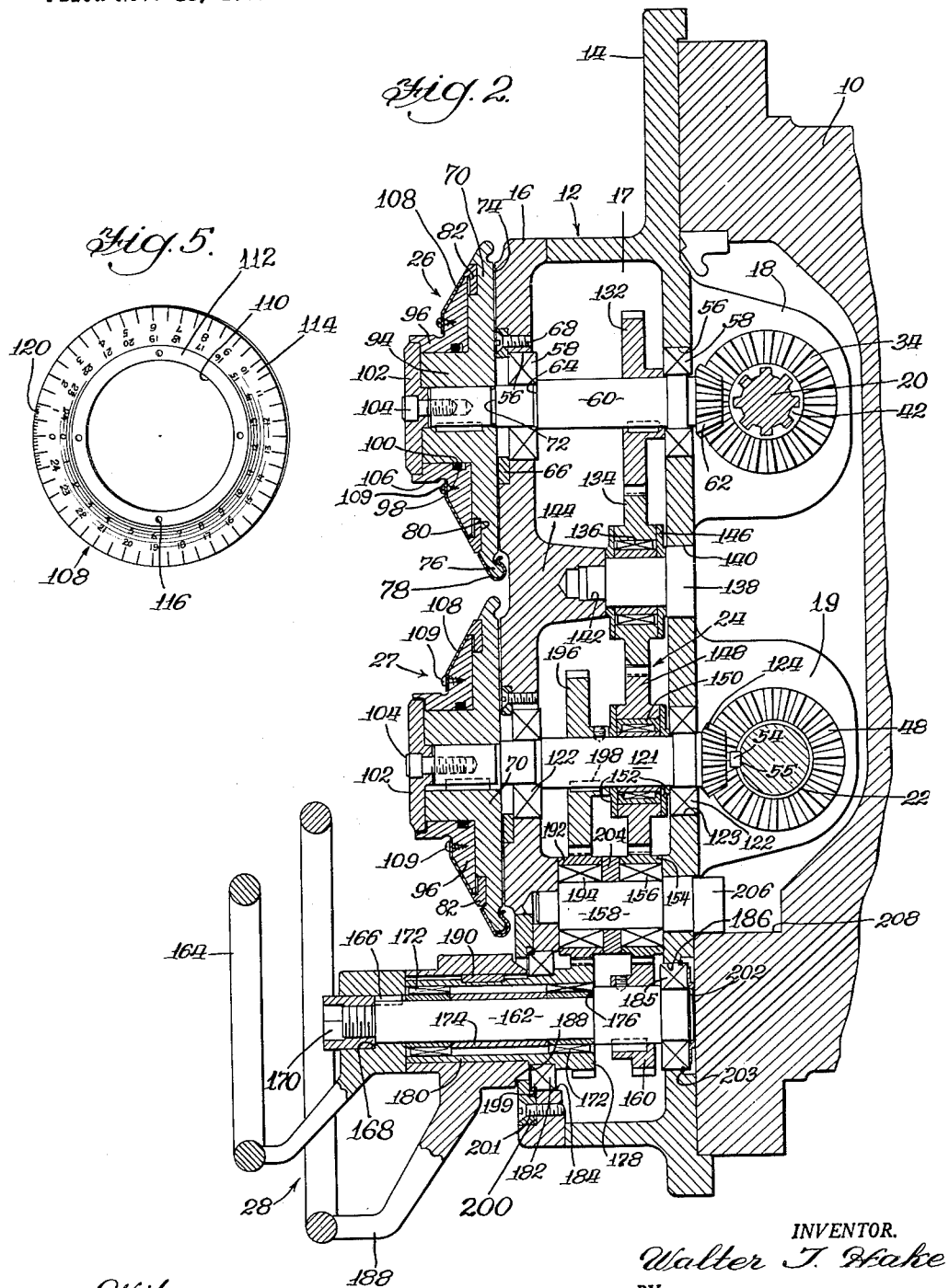
FIGURE 2 is a vertical section through the rail and hand wheel bracket assembly.

Referring to FIGURE 2, it is seen that a hand wheel bracket, generally indicated at 12, is slidably mounted for horizontal movement on the rail 10 of a boring mill. The hand wheel bracket, or housing, comprises a body portion 14 and a cover 16, thereby forming an enclosed cavity 17. The body 14 is provided with dual projections 18 and 19 whereby geared connection is made to the feed rod 20 and the cross feed screw 22, as will be hereinafter described. The feed rod 20 is conventionally splined throughout its length, and the cross feed screw is provided with a single keyway 55 for a purpose to be explained. Internally of the housing is a gear train, generally indicated at 24. Dial connections, generally indicated at 26 and 27 are provided externally of the housing, as also is a dual hand wheel assembly, indicated generally at 28.

Figure 4:
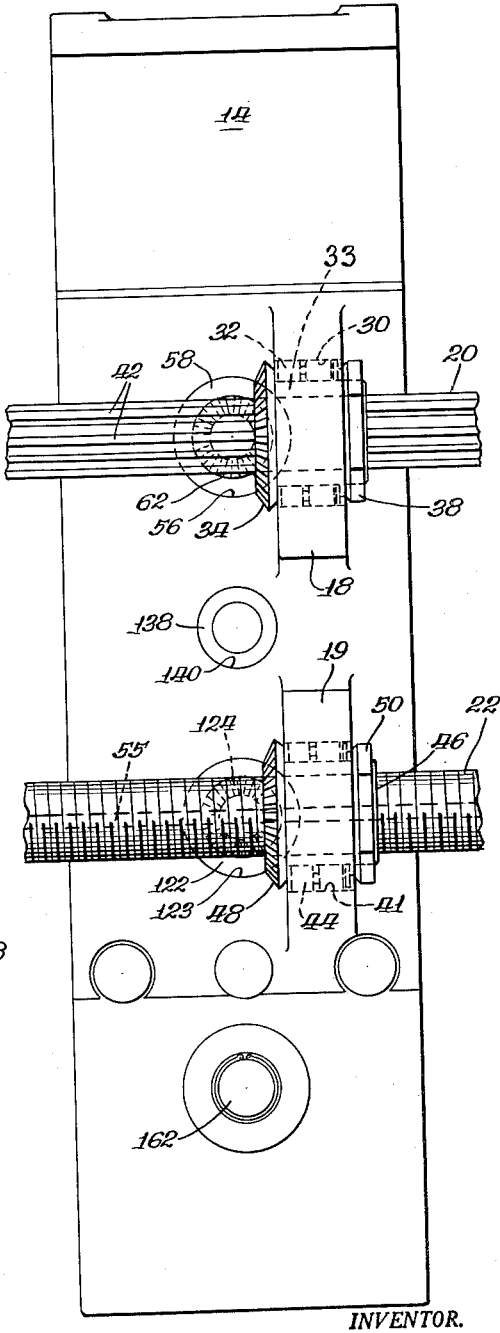
FIGURE 4 is a rear elevational view of the device of FIGURE 2, showing more clearly the geared connection between the dial mechanisms and the feed rod and feed screw of the boring mill.

The projections 18 and 19 extend rearwardly of the housing, the projection 18 being adjacent the feed rod 20 and the projection 19 being adjacent the cross feed screw 22. The projection 18 is provided with an opening 30 (FIGURE 4), surrounding the rod 20. Mounted in the opening 30 is an antifriction bearing 32 adapted to rotatably receive the elongated hub portion 33 of bevel gear 34; the gear being held in place by a lock washer and nut assembly 38. Referring again to FIGURE 2, it is seen that the gear 34 is provided with internal splines 42, which slidably receive corresponding splines on the feed rod 20. The projection 19 is similarly provided with an opening 41 carrying an antifriction bearing 44 (FIGURE 4) adapted to rotatably receive hub portion 46 of bevel gear 48. The gear 48 is held in place by means of a lock washer and nut assembly 50. The gear 48 is provided with a key 54 (FIGURE 2) which is slidably received in a keyway 55 extending axially along cross feed screw 22. By reason of the splined connection between the gear 34 and rod 20 and the keyed connection between the gear 48 and the screw 22, the entire hand wheel bracket assembly may be moved horizontally along the rail 10 in a direction toward or away from the table of the machine as may be desired by the operator.

Figure 3:
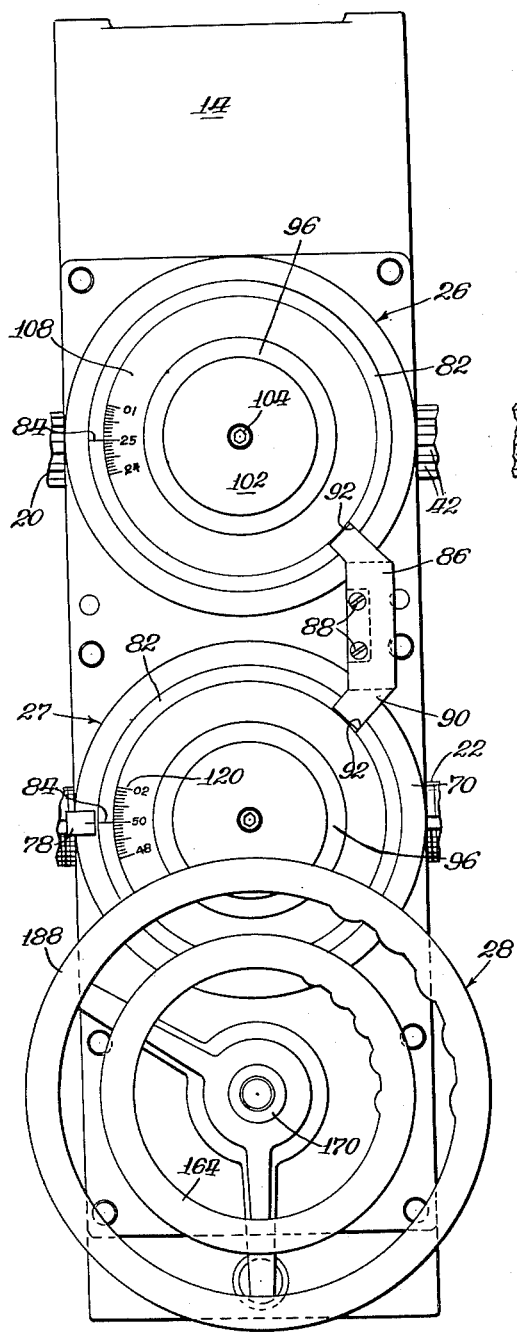
FIGURE 3 is a front elevational view of the device of FIGURE 2, showing the relative position of the hand wheels and dials.

The housing and cover are provided with aligned openings 56 in which are mounted antifriction bearings 58 to receive the ram controlling dial shaft 60. A pinion 62 is preferably formed integral with the shaft and is engageable with the gear 34. The bearing 58 in the cover 16 seats against a shoulder 64 and is held in place by means of a retaining ring 66, which is screwed to the cover by means of cap screws 68. Movement of the shaft 60 to the right, as shown in FIGURE 2, is restrained by mating gears 62 and 34, and movement of the shaft to the left is restrained by the shoulder 64, the bearing 58 and the retainer ring 66. The shaft 60 extends outwardly of the cover 16 and is provided with a second shoulder 72. Abutting shoulder 72 and keyed to the extension of shaft 60 for rotation therewith, is a reference dial 70. The extreme outer periphery of the reference dial is formed into a narrow annular projection 76 adapted to receive one or more reference clips 78, the purpose of which will be explained hereinafter. Radially inward of the clip projection 76 is a recess 80 in which is received a "zero" ring 82 having on its outer face a single scribed line 84 (FIGURE 3). The ring 82 is held stationary relative to the assembly by means of a ring lock 86, which is secured to the cover by any desired means, such as cap screws 88. The ring lock is provided with raised wings 90 which span the reference dial 70 and engage a radial slot 92 in the ring 82. The reference dial 70 is provided with a hub 94 adapted to receive an indicating dial 96, frictionally but rotatably engaged therewith by means of a friction O ring 100 received in a peripheral slot 98 in the indicating dial 96. The assembly is maintained by a cap 102 secured to the shaft extension by a cap screw 104. It should be understood that the "zero" ring 82 is stationary, whereas the reference dial 70 and indicating dial 96 are rotatable with the shaft. The indicating dial is also manually rotatable relative to the reference dial and shaft by virtue of the friction O ring 100. To facilitate rotation of the indicating dial 96, a portion 106 thereof is formed into a knurled surface. The outer surface of the dials and ring are shaped frustro-conically and the dial 96 receives thereon a dial plate 108 having a corresponding frusto-conical portion. The dial plate is rotatable with the indicating dial and may be secured thereto in any desired manner, as, for example, by means of sheet metal screws 109.

Referring to FIGURE 5, it is seen that the dial plate 108 is generally circular in shape and has an opening 110 therethrough. The inner portion 112 of the plate extends substantially radially of the axis thereof and the outward portion of the plate is flared downwardly to form a frustro-conical portion 114 (FIGURE 2). In the preferred embodiment, the plate is formed from a sheet aluminum stamping, but other materials might, of course, conceivably be used. Photoetched in raised characters on the flared portion of the plate are graduations 120, which are calibrated to correspond to predetermined increments of movement of the tool carrying member of the boring mill. The background of the plate is filled in with dull black enamel to more clearly set off the etched characters. The frustro-conical shape of the photoetched portion tends to facilitate reading of the dial indicator from various angles. Openings 116 are provided in radial portion 112 through which screws 109 may be inserted to secure the dial plate to the reference dial. In the preferred method of fabrication, the plate may be stamped from a piece of sheet metal in the form of a flat ring. The ring is then photoetched, as desired, and subsequently formed into its final frustro-conical shape. A dial plate of this type may be made for a small fraction of the cost of the dial plates heretofore in use on machines of this type. Furthermore there are no grooves in the plate which can become clogged with dirt or grease, and the figures and numbers are therefore always much more easily read by the machine operator. If a plate should somehow become damaged and replacement necessitated, it is merely necessary to remove a few screws and replace the damaged plate by a new one, also at a very small cost.

A second dial shaft assembly 27 is provided adjacent the cross feed screw, similar in structure to that described above for the feed rod dial shaft. In this assembly, the dial shaft 121 is rotatably carried in bearings 122, received in openings 123 in the housing and cover. The dial shaft 121 carries a bevel pinion 124, preferably integral therewith, engageable with the bevel gear 48. The dial shaft 121 also extends outwardly of the cover, and carries for rotation therewith a second reference dial 70 and an indicating dial 96. The reference dial 70 is recessed (FIG. 2) to support a stationary "zero" ring 82, as described above, and a dial plate 108 is detachably secured to the indicating dial. The assembly is maintained, as previously described, by a cap 102 and cap screw 104.

Internally of the housing, a gear 132 is keyed to dial shaft 60 for rotation therewith and meshes with idler gear 134, journaled by means of needle bearings 136 on a stud shaft 138 pressed into an opening 140 in the housing and an opening 142 in an internal boss 144 of the cover 16. Proper axial alignment between gears 132 and 134 is obtained by means of spacers 146. Idler gear 134, in turn, meshes with idler gear 148, rotatably mounted on dial shaft 121 by means of needle bearings 150. The gear 148 meshes with a gear 154 journaled on stud shaft 158 by means of needle bearings 156, said stud shaft 158 being supported in the housing and cover in a manner similar to that of stud shaft 138. Idler gear 154 meshes with a gear 160 keyed to hand wheel shaft 162 for rotation therewith. The hand wheel shaft 162 extends outwardly of the cover and carries at its extreme outer end a ram hand wheel 164, said wheel being keyed, as at 166, to the shaft for rotation therewith. The hand wheel 164 is provided with an internal shoulder 168 against which is seated an Allen nut 170, which is threaded to the shaft 162. The hand wheel 164 is held in its outward position by means of the inner races of needle bearings 172 and a spacer 174 through which the load is transmitted to a shoulder 176 on shaft 162. Through the above described gear train manual rotation of the hand wheel 164 will transmit rotation to the dial shaft 60 and thence through the pinion 62 and bevel gear 34 to the feed rod 20. The rotating feed rod will move the tool carrying ram upwardly or downwardly away from or toward the work piece, depending on the direction of rotation of the rod. The tool travel will be indicated directly on the dial indicator, as previously explained.

Mounted on the needle bearings 172 and rotatable thereon relative to the shaft 162 is a rail head gear 178 having a tubular extension 180 surrounding the bearings. The inner race of an antifriction bearing 182 is mounted on gear extension 180, while the outer race of the bearing 182 is received in an opening 184 in the cover 16. Another antifriction bearing 185 surrounds the inner end of the shaft 162 and is received in an opening 186 in bracket body 14. Two-point support is therefore given to the shaft 162 by bearings 182 and 185. The rail head hand wheel 188 is mounted on gear extension 180, immediately under the ram hand wheel 164. The hand wheel 188 is keyed as at 190 to the extension 180 so that the rotative motion of the hand wheel will be transmitted to the gear 178. The gear 178 meshes with an idler gear 192, which is supported for rotation on the stud shaft 158 by means of needle bearings 194. Idler gear 192, in turn, meshes with cross feed gear 196, which is keyed as at 198 to the dial shaft 121 for rotation therewith. Rotation of hand wheel 188 will be transmitted, therefore, through the gears 178, 192 and 196 to the shaft 121. Rotation of shaft 121 will cause corresponding rotation of cross feed screw 22, which will impart horizontal movement of the tool carrying rail head toward or away from the work piece, depending on the direction of rotation of the screw 22. Inasmuch as the shaft 121 is being rotated proportionately with screw 22, the horizontal motion of the tool will be indicated on the dial indicator secured to the outer end of shaft 121.

The bearing 182 is positioned by means of a snap ring 199 and a retainer ring 200 secured to the cover 16 by a plurality of screws 201. The bearing 185 is positioned relative to shaft 162 by means of snap ring 202 and relative to the housing by means of snap ring 203. Additionally, gears 154 and 192 are positioned on stud shaft 158 by means of a spacer 204.

To facilitate movement of the hand wheel bracket on rail 10, the stud shaft 158 is provided at its inner end with an antifriction bearing 206, adapted to contact a shelf 208 of the rail. This provides an antifriction track whereby the entire hand wheel bracket may be easily moved horizontally across the rail either toward or away from the work piece which is mounted on the rotating table.

During automatic operation of the boring mill the feed of the cutting tool relative to the work piece may be axial, radial, or a combination of these two motions which would occur when an angular cut is being taken. If a turning operation is being performed the cutting tool moves axially of the work piece, the feed rod 20 rotates and the cross feed screw 22 is stationary. The distance traversed by the cutting tool is shown on the dial indicator 26, inasmuch as the dial shaft 60 is rotated by gears 62 and 64.

If a facing operation is performed on the work piece, the tool moves radially, the cross feed screw 22 rotates and the vertical feed rod is stationary. Under these conditions, the amount of movement of the tool is shown on the corresponding dial indicator 27, because shaft 121 is rotated by the bevel gears 124 and 48. If a final accurate facing cut, for example, were to be made, the automatic feed of the machine is first shut off. The operator then gauges the work piece to determine the exact amount of material to be removed to bring the work piece to the finished size. For the purpose of the example, we may assume that an additional .015 inch is to be removed. The operator would then manually rotate the indicating dial 96 of unit 26, carrying the dial plate 108, to the zero point at which time the zero dial plate would be aligned with the marking on the dial plate 84 of the "zero" ring 82. The operator would then rotate the hand wheel 164, which, through the associated gear train, would move the ram downward, and this motion would be indicated on the dial plate inasmuch as the shaft 60 would also be rotated. The hand wheel 164 would be turned a sufficient amount so that the .015 graduation of the dial plate would be aligned with the reference line 84, indicating that the tool had been advanced the desired .015 of an inch.

The final cut would then be taken on the automatic feed.

Turning a work piece to the final desired diameter would be accomplished in a similar manner utilizing, however, the hand wheel 188 and its associated dial indicator 27. The purpose of the reference clips 78 is to mark a particular point on the dial plate for repetitive work, as in the machining of production items, where successive identical cutting operations are to be performed on identical work pieces.

This invention provides, therefore, compact manual adjustment means for the cutting tool of a vertical boring mill, which can be moved horizontally relative to the work piece thereby greatly facilitating the proper positioning of the tool. Also the hand wheels, by which the tool adjustments are made are positioned within easy reaching distance of the operator, and in a position where they will in no way interfer with the reading of the dial indicators. Furthermore, a dial indicator plate has been provided which is inexpensive to make, can be quickly replaced when necessary, and which will not only stay clean and readable for a longer time than conventional dial indicator plates, but can be very easily cleaned if the figures thereon should become covered with dirt or grease.

Though the invention has been illustrated and described with regard to the railhead of a vertical boring mill it will be understood that the device may be readily adapted to other similar applications. For example, only minor modifications would be required to adapt the invention to adjust the horizontal or vertical position of the sidehead carried tool of a vertical boring mill.

I claim:

1. In a manual tool positioning device for a vertical boring mill having a rotatable work table, a tool holding member movable vertically in a horizontally movable rail head, a horizontally disposed feed rod for imparting vertical movement to the member, and a feed screw for imparting horizontal movement to said rail head, the rod and screw being carried by a rail in substantially parallel relationship to each other; a hand wheel bracket movably mounted on said rail for sliding movement therealong, a first dial shaft journaled in said bracket adjacent said rod and having a geared connection thereto, a portion of said shaft projecting outwardly of said bracket and having a dial indicator secured thereto, a second dial shaft journaled in said bracket adjacent said screw and having a geared connection thereto, a portion of said second shaft projecting outwardly of said bracket and having a dial indicator secured thereto, said indicators being calibrated and marked to show the amount of vertical or horizontal tool member movement, respectively, a hand wheel shaft journaled in the bracket and projecting outwardly thereof, a first hand wheel secured to said shaft for rotation therewith, a mechanical connection between said shaft and the first dial shaft, and a second hand wheel rotatably journaled on said shaft, said second hand wheel having a mechanical connection to said second dial shaft.

2. In a manual tool positioning device for a vertical boring mill having a rotatable work table, a horizontal rail, a head movable horizontally across the rail, a ram movable vertically in the head, a feed rod operatively associated with said ram to move the ram vertically a distance proportional to the amount of rotation of the rod, and a feed screw operable to move the head a distance proportional to the amount of rotation of the screw; means operatively connected to said rod to indicate the amount of movement thereof, other means operatively connected to said screw to indicate the amount of movement thereof, and manually rotatable power means operatively connected to respective means for actuation thereof, said power means having a common axis of rotation, said axis being unassociated with the axes of rotation of said respective means.

3. A dial positioning device according to claim 2, wherein the power means comprises a hand wheel shaft, a hand wheel secured to said shaft for rotation therewith, a gear train interconnecting said hand wheel shaft and said first dial shaft, another hand wheel rotatably mounted on the hand wheel shaft, and a gear train interconnecting said other hand wheel and said second dial shaft.

4. In a vertical boring mill having a rod and screw for imparting vertical and horizontal motion respectively to a tool carrying member, the combination of means engageable with said rod for indicating the amount of vertical movement of said member, other means engageable with said screw for indicating the amount of horizontal movement of said member, and composite means separate from said indicating means for selectively rotating, through related indicating means, said rod and screw, said composite means having a common rotational axis, and a bracket for carrying all of said means, said first-mentioned means comprising a gear carried by the bracket and in splined engagement with the rod, and said other means comprising a gear carried by the bracket and in sliding keyed engagement with the screw, so that said bracket is movable longitudinally of said rod and screw while said rod and screw are motionless.

5. In a vertical boring mill having a rod and screw for imparting vertical and horizontal motion respectively to a tool carrying member, the combination of means rotatable on a first axis of rotation and engageable with said rod for indicating the amount of vertical movement of said member, other means rotatable on a second axis of rotation and engageable with said screw for indicating the amount of horizontal movement of said member, and composite means rotatable on a third axis of rotation for selectively rotating, through related indicating means, said rod and screw, and a bracket for carrying all of said means, said bracket being movable longitudinally of said rod and screw without rotating said rod or screw.

6. In a vertical boring mill having a rotatable work piece carrying table, a tool carrying member movable vertically in a horizontally movable rail head, a feed rod to move the member and a feed screw to move the head; the combination of a hand wheel bracket slidably mounted on the rail, dial indicating means carried by the bracket and operatively connected to the rod, other dial indicating means carried by the bracket and operatively connected to the screw, and drive means to manually, selectively actuate said indicating means, said drive means comprising a shaft rotatably mounted in said bracket and extending outwardly thereof, a hand wheel secured to the outer end of said shaft for rotation therewith, power transmission means interconnecting said shaft with one of the dial shafts, a sleeve rotatably journaled on said shaft, a second hand wheel secured to said sleeve for rotation therewith, and power transmission means interconnecting said sleeve and the other dial shaft.

7. In a manual tool positioning device for a boring mill having a rotatable work table, a horizontal rail, a head movable horizontally across the rail, a ram movable vertically in the head, a feed rod operable by rotation thereof to move the ram, and a feed screw operable by rotation thereof to move the head; a housing slidably mounted for horizontal movement on said rail when said rod and screw are stationary, a pair of projections on said housing, each projection having an opening therethrough receiving said rod and screw, respectively, a bevel gear rotatably mounted on each of said projections, said gears having slidable splined connection with the respective rod and screw, a dial shaft journaled in the housing adjacent each of said projections, each shaft having a pinion engageable with the respective gear, said dial shafts extending outwardly of said housing, dial indicating means operatively connected to said extensions, and manual operating means carried by said housing and having mechanical connection to said dial shafts whereby said rod or screw may be rotated to obtain a desired tool setting, said operating means comprising a shaft rotatably mounted in the housing, a first hand wheel secured to said shaft for rotation therewith, a gear train connecting said shaft to one of said dial shafts, a second hand wheel rotatably mounted on said shaft, and a gear train connecting said second hand wheel to the other dial shaft.

References Cited in the file of this patent
UNITED STATES PATENTS

| | | |
|---|---|---|
| 939,043 | Libby | Nov. 2, 1909 |
| 1,650,422 | Brown | Nov. 22, 1927 |
| 1,760,938 | Edgar | June 3, 1930 |
| 1,775,006 | Trosch | Sept. 2, 1930 |
| 2,336,163 | Bullard | Dec. 7, 1943 |
| 2,441,636 | Kaufman | May 18, 1948 |
| 2,520,868 | Whiting | Aug. 29, 1950 |

FOREIGN PATENTS

| | | |
|---|---|---|
| 592,668 | Great Britain | Sept. 25, 1947 |